(12) United States Patent
Blum et al.

(10) Patent No.: US 7,711,222 B2
(45) Date of Patent: May 4, 2010

(54) TUNABLE DISPERSION COMPENSATION APPARATUS

(75) Inventors: Robert Blum, Palo Alto, CA (US); Hindrik Bulthius, Edinburgh (GB); Christopher Doerr, Middletown, NJ (US)

(73) Assignees: Alcatel-Lucent USA Inc., Murray Hill, NJ (US); Gemfire Corporation, Fremont, CA (US)

( * ) Notice: Subject to any disclaimer, the term of this patent is extended or adjusted under 35 U.S.C. 154(b) by 592 days.

(21) Appl. No.: 11/308,045

(22) Filed: Mar. 3, 2006

(65) Prior Publication Data
US 2007/0206896 A1 Sep. 6, 2007

(51) Int. Cl.
*G02B 6/34* (2006.01)

(52) U.S. Cl. .................................. 385/37; 385/50

(58) Field of Classification Search .................. 385/2, 385/12, 14, 15, 28, 31, 50; 398/10, 11, 29, 398/30, 31
See application file for complete search history.

(56) References Cited

U.S. PATENT DOCUMENTS

| | | | | |
|---|---|---|---|---|
| 6,055,349 A * | 4/2000 | Seino et al. | ..................... | 385/50 |
| 6,320,888 B1 * | 11/2001 | Tanaka et al. | .................. | 372/32 |
| 6,587,615 B1 * | 7/2003 | Paiam | .......................... | 385/24 |
| 6,813,409 B2 * | 11/2004 | Horst | ........................... | 385/17 |
| 6,920,159 B2 * | 7/2005 | Sidorin et al. | .................. | 372/20 |
| 6,973,231 B2 * | 12/2005 | Zhang et al. | .................... | 385/24 |
| 6,999,238 B2 * | 2/2006 | Glebov et al. | ................ | 359/619 |
| 7,016,098 B2 * | 3/2006 | Giles et al. | ................... | 359/290 |
| 7,072,117 B2 * | 7/2006 | Glebov et al. | ................ | 359/619 |
| 7,155,086 B2 * | 12/2006 | Saida et al. | .................... | 385/27 |
| 7,177,502 B2 * | 2/2007 | Tsai et al. | ....................... | 385/37 |
| 7,190,858 B1 * | 3/2007 | Greiner et al. | ................. | 385/37 |
| 7,248,617 B2 * | 7/2007 | Volodin et al. | ............... | 372/102 |
| 2001/0022878 A1 * | 9/2001 | Saida et al. | .................... | 385/27 |
| 2003/0174951 A1 * | 9/2003 | Doerr | ........................... | 385/37 |
| 2004/0037531 A1 * | 2/2004 | Andrews et al. | ............. | 385/130 |
| 2004/0071390 A1 * | 4/2004 | Horst | ........................... | 385/17 |
| 2004/0218889 A1 * | 11/2004 | Shelnut et al. | ............... | 385/143 |
| 2005/0117195 A1 * | 6/2005 | Glebov et al. | ................ | 359/290 |
| 2005/0232543 A1 * | 10/2005 | Tsai et al. | ....................... | 385/37 |
| 2006/0082885 A1 * | 4/2006 | Glebov et al. | ................ | 359/619 |
| 2006/0256831 A1 * | 11/2006 | Volodin et al. | ............... | 372/102 |
| 2008/0019640 A1 * | 1/2008 | Blum | ........................... | 385/37 |

\* cited by examiner

*Primary Examiner*—Frank G Font
*Assistant Examiner*—Peter Radkowski
(74) *Attorney, Agent, or Firm*—Brosemer, Kolefas & Associates

(57) ABSTRACT

A colorless tunable optical dispersion compensator (TODC) comprising a silica arrayed-waveguide grating (AWG) directly coupled to a polymer thermo-optic lens. As a result of its inventive construction, the device exhibits low loss, large tuning range, low electrical consumption and is readily manufactured using standard processes. Additionally, the TODC is fully solid-state and scales to a large figure-of-merit (dispersion range times bandwidth squared).

20 Claims, 10 Drawing Sheets

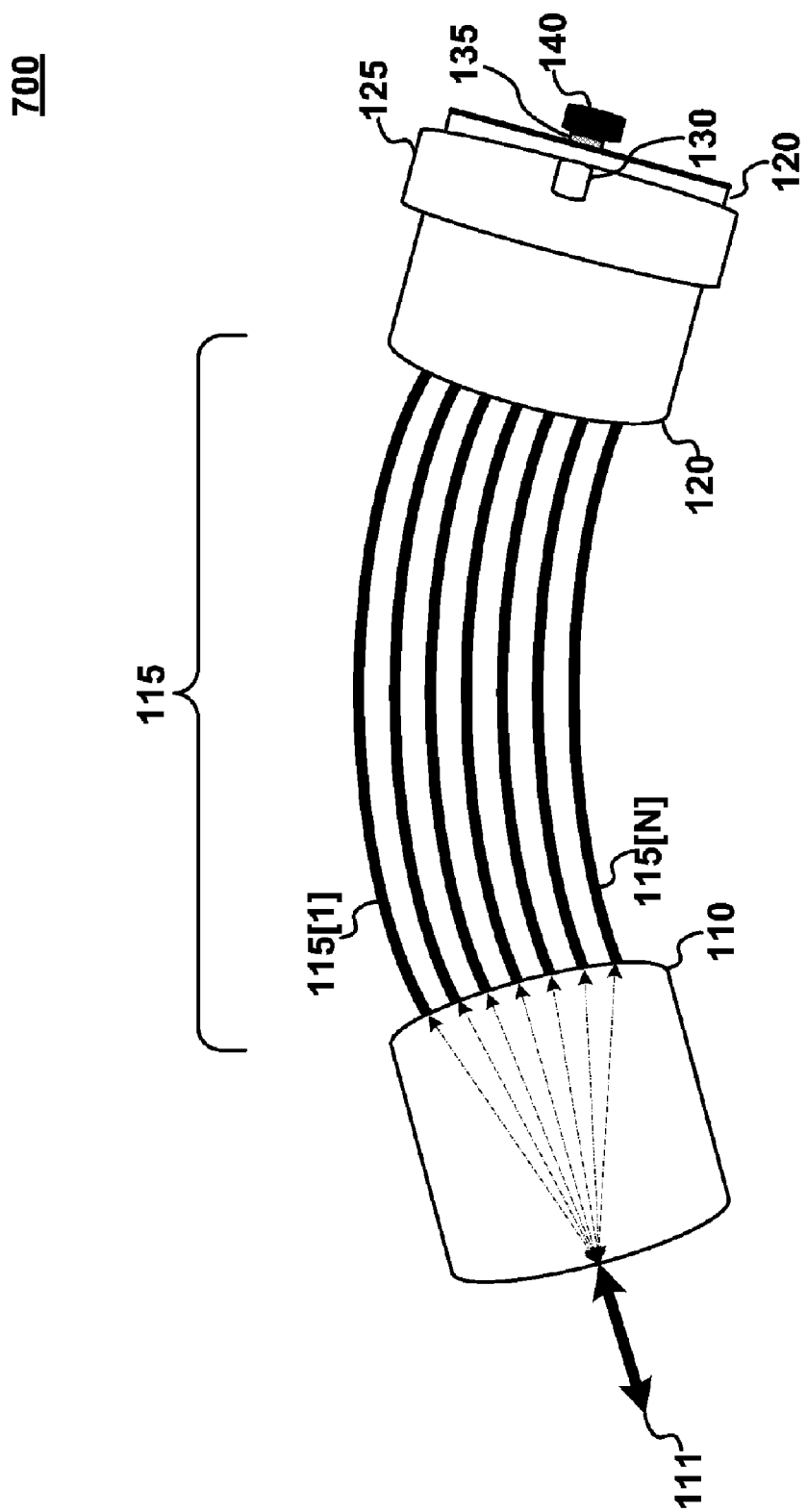

TUNABLE DISPERSION COMPENSATION APPARATUS

FIELD OF THE INVENTION

This invention relates generally to the field of optical communications and in particular to a tunable dispersion compensation apparatus.

BACKGROUND OF THE INVENTION

In long-distance transmission of optical signals, the accumulation of chromatic dispersion in optical fiber presents serious problems. These problems intensify with an increase in bit rate and the distance traveled by the optical signals. Efforts to date that compensate for dispersion have mainly involved the use of dispersion compensating fiber (DCF).

Dispersion compensating efforts that employ DCF—while well-proven—are not particularly amenable to integration in existing network elements. This is due—in part—because DCF is employed as a large spool of fiber which occupies significant space in a network office and is not adjustable. In addition, service providers that utilize DCF in their networks must accurately characterize their fiber, deploy more expensive optical amplifiers, and accept additional latency added to links employing the DCF [~20% additional latency for a fully compensated standard-single-mode fiber (SSMF) link]. Finally, DCF cannot satisfy all of the dispersion compensation requirements of many 40-Gb/s links, consequently, a tunable optical dispersion compensator (TODC) having a small tuning range is often required in addition to the DCF.

A TODC employing an arrayed waveguide grating (AWG) and thermo-optic lens was described in U.S. Pat. No. 7,006,730 directed to a "Multichannel Integrated Tunable Thermo-Optic Lens and Dispersion Compensator"). And while the TODC described therein appeared to be an attractive alternative/supplement to DCF, it unfortunately required significant electrical power (7.3 W to tune over 400 ps/nm) and generated relatively high local temperatures thereby negatively impacting its long-term reliability.

SUMMARY OF THE INVENTION

We have developed, in accordance with the principles of the invention, a tunable optical dispersion compensation apparatus (TODC) which permits the programmable fine tuning of the amount of dispersion compensation applied. Our apparatus comprises a silica arrayed-waveguide grating (AWG) directly coupled to a polymer thermo-optic lens. As a result of its inventive construction, our TODC exhibits low loss, large tuning range, low electrical consumption and is readily manufactured using standard processes.

Advantageously, our inventive TODC is fully solid-state, compact, scales to a large figure-of-merit and may be employed in a variety of optical transmission systems while minimizing the need for DCF.

BRIEF DESCRIPTION OF THE DRAWING

A more complete understanding of the present invention may be realized by reference to the accompanying drawing in which:

FIG. 7 shows a schematic of another alternative embodiment of a dispersion compensation apparatus according to the present invention;

FIG. 8($b$) shows a schematic of an alternative embodiment of the "unfolded" dispersion compensation apparatus of FIG. 8($a$); and FIG. 8($c$) shows a schematic of yet another alternative embodiment of the "unfolded" dispersion compensation apparatus of FIG. 8($a$).

DETAILED DESCRIPTION

Optical switching, multiplexing, and demultiplexing have been accomplished in the past by using an interconnection apparatus having one or more input waveguides communicating with the input of a star coupler. The output of the star coupler communicates with an optical grating comprising a series of optical waveguides, each of the waveguides differing in length with respect to its nearest neighbor by a predetermined fixed amount. The grating is connected to the input of a second star coupler. The second star coupler has one or more output waveguides which form the outputs of the switching, multiplexing, and demultiplexing apparatus. An example of such an interconnection apparatus is disclosed in U.S. Pat. Nos. 5,002,350 and 5,136,671, the entire contents and teachings of which are incorporated herein by reference.

The geometry of such an apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelength also permits switching between any selected input port to any selected output port. Accordingly, these devices are referred to as frequency routing devices.

Figure 1:
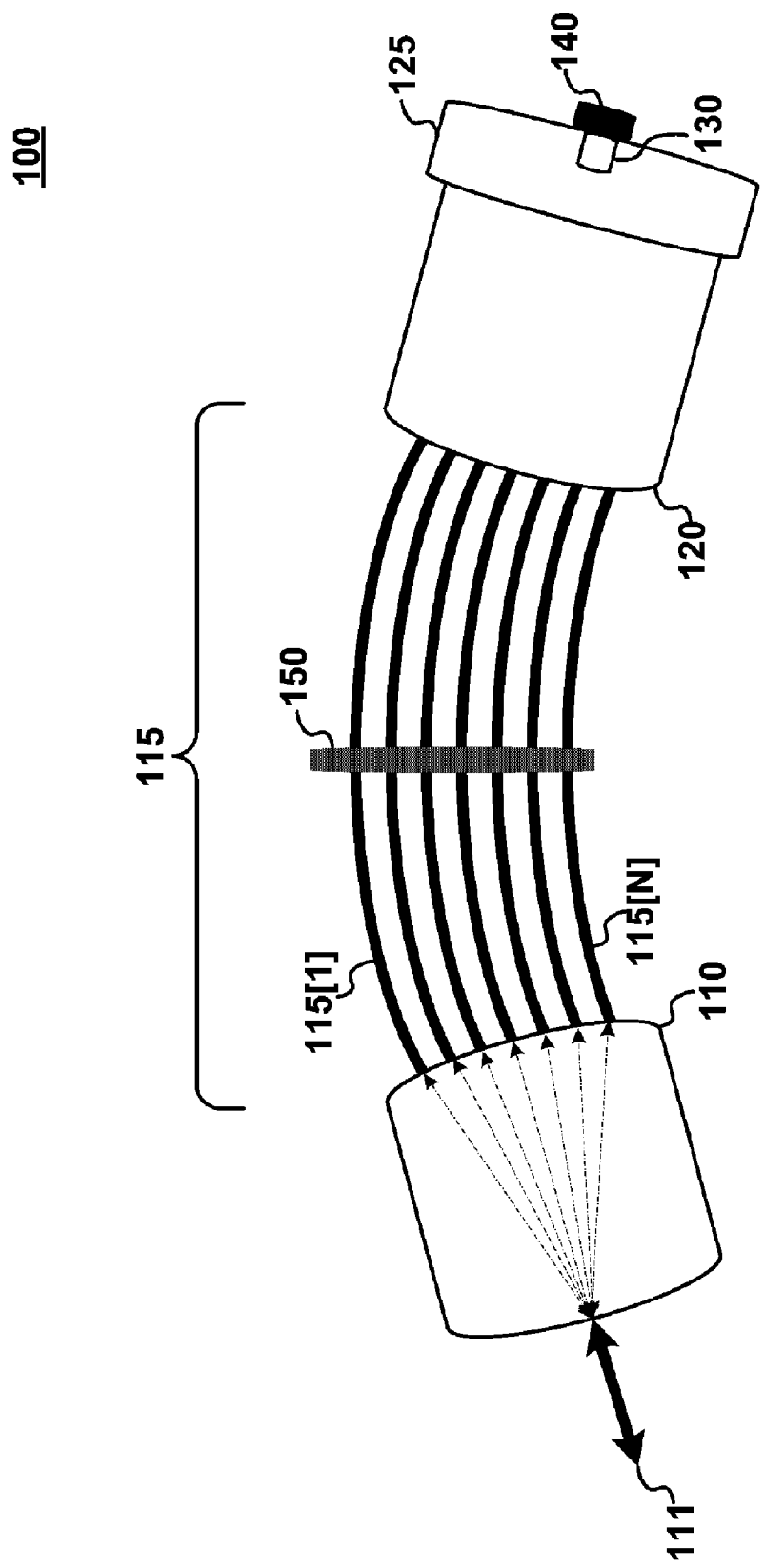
FIG. 1 shows a schematic of a dispersion compensation apparatus constructed according to the present invention.

Sharing some common elements with such frequency routing devices, FIG. 1 shows in schematic form the pertinent details of our inventive tunable dispersion compensation apparatus. The apparatus includes an input/output waveguide port 111 connected to an input circle of a free space region of a slab waveguide 110 (first star coupler).

A plurality of output ports extends from an output circle of the free space region of the slab waveguide 110 and is connected to an optical grating 115. The optical grating 115 comprises a plurality of unequal length waveguides 115[1] ... 115[N] which provides a predetermined amount of path length difference to a corresponding plurality of input waveguides connected to an input circle of a free space region of another slab waveguide 120 (second star coupler). A half-wave plate 150, used to reduce overall polarization dependence, is disposed at substantially a mid-point of the grating 115

At an opposite, output end of the slab waveguide 120, positioned adjacent (where output waveguides would be located in a "pure" frequency routing device), is a planar lightwave circuit (PLC) 125 which includes a heating element(s) 130 and a mirror 140. For our purposes, the PLC is constructed from a material that exhibits a suitable refractive index change upon heating while, at the same time, exhibiting a sufficient thermal conductivity such that it is easily heated. Overall, what is used is a PLC having adequate thermal properties to exhibit a good thermal profile and thus, a preferably parabolic or similar index profile on the required length scale (~550 um in this case). In this manner, the PLC behaves as a thermo-optic lens by providing a preferred parabolic (or similar) refractive index profile whose magnitude can be electrically (heated) controlled. The total slab length, the length of 120 plus the length of 125 times the refractive index of 125 divided by the refractive index of 120, is equal to an original slab length of refractive index of 120 where the output waveguides would be located in a "pure" frequency routing device. In other words, the presence of 125 requires that the 120 is shortened accordingly.

When configured in this manner, portions of light input to input/output waveguide 111 traverses the first slab waveguide 110, the grating 115, the second slab waveguide 120, traverses the thermo-optic lens PLC 125, is reflected by the mirror 140, and subsequently output via input/output waveguide 120 having a majority of its accumulated dispersion compensated. Note that there may be more than one input/output waveguide 111, for the purpose of adjusting the wavelength of the TODC.

In a preferred embodiment, the mirror 140 length along slab 120 will only be equal to or less than the width of the Brillouin zone. This ensures that high spatial diffraction orders from the grating are not reflected back into the grating. In addition, in a preferred embodiment, the mirror 140 is substantially flat as it is easiest to cut and/or polish a flat surface, both for the PLC 125 and for the mirror 140. As can be appreciated, when the mirror 140 is flat, the device provides negative dispersion when no heating elements in 130 are activated which compensates the dispersion of most single-mode optical fibers, most notable standard single-mode fiber, which has a dispersion of ~+17 ps/nm/km in the C-band.

It may be noted at this point that we may advantageously use the heating elements to adjust focal length and/or add a constant phase since the heat profile includes an offset that may be adjusted as needed. Alternatively, certain ones of the heating elements may be used to generate an offset while others may be used to create the parabolic (or similar) heat profile. As can be readily appreciated by those skilled in the art, through the selective use of our heating elements nearly any suitable heat and/or index distribution may be produced, as needed and/or desired.

Figure 2:
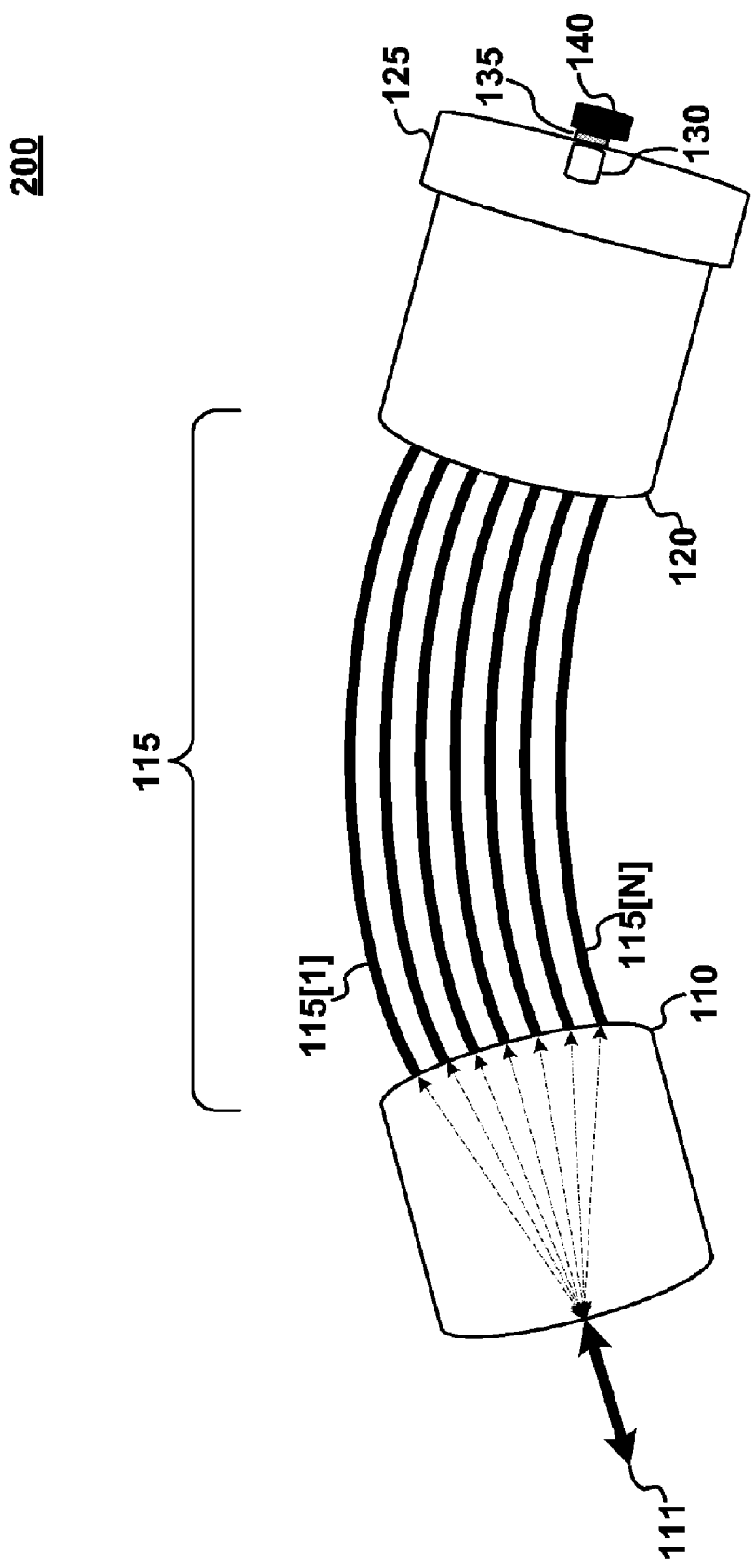
FIG. 2 shows a schematic of an alternative embodiment of the dispersion compensation apparatus of FIG. 1.

Turning our attention now to FIG. 2, there is shown an alternative embodiment of our inventive tunable dispersion compensator. Shown in FIG. 2 is an alternative configuration in which a quarter-wave plate 135 is positioned between the PLC 125 and the mirror 140. This will cause transverse electric polarization to flip to transverse magnetic polarization and vice-versa upon reflection from the mirror and quarter-wave plate, advantageously reducing the polarization dependency of the dispersion compensator. In some cases, this is preferable to the half-wave plate inserted into the middle of the grating, as shown in FIG. 1, because the half-wave plate may cause an undesirable back reflection.

Figure 3:
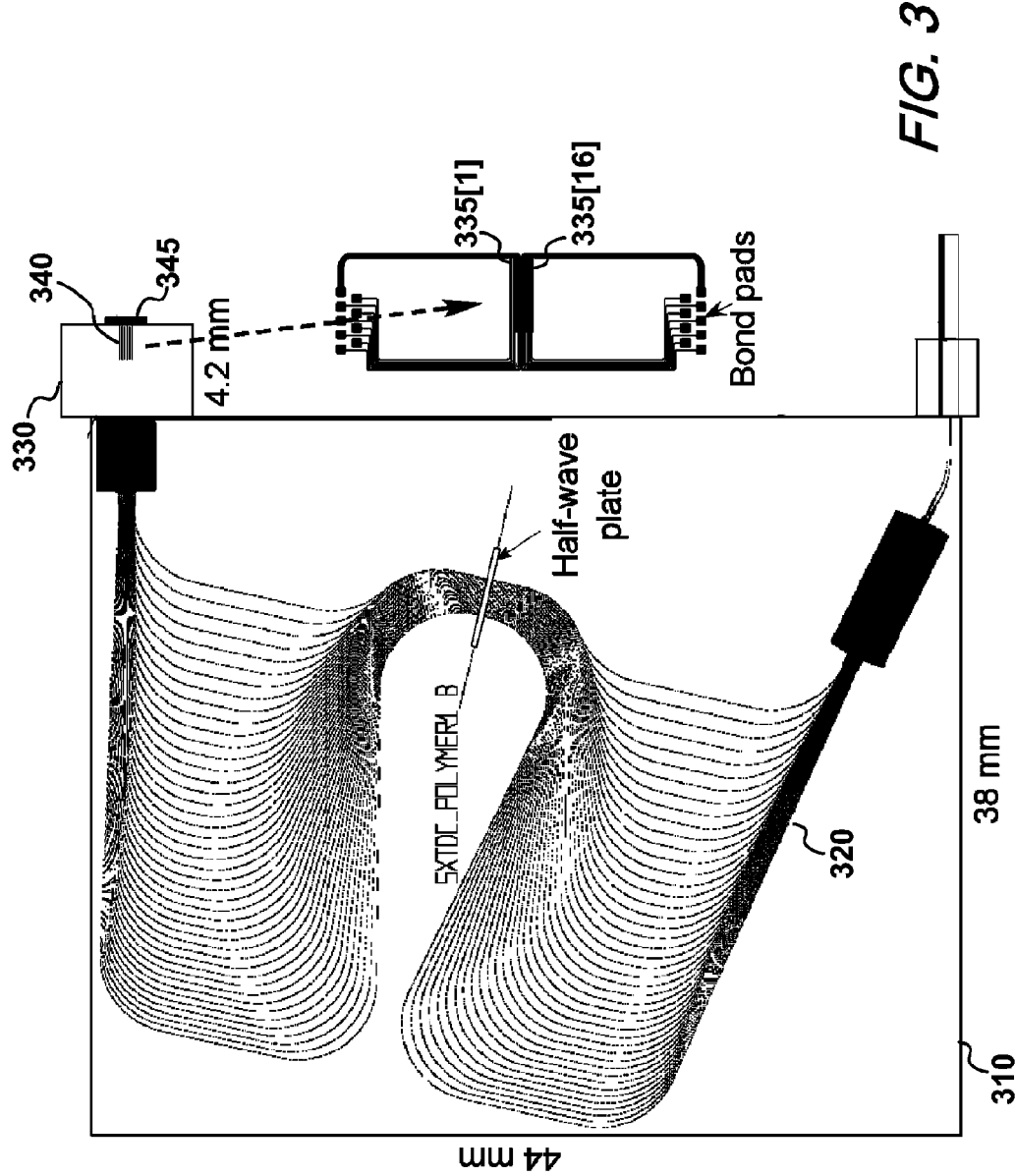
FIG. 3 shows a schematic of the embodiment of the dispersion compensation apparatus of FIG. 1 with additional details.

FIG. 3 shows a schematic of an exemplary tunable optical dispersion compensator (TODC) 300 constructed according to our inventive principles. More particularly, the TODC comprises a silica PLC (~38×44 mm$^2$) 310 having an AWG 320 attached to a much smaller (~4.2×10mm$^2$) polymer PLC 330 comprising a thermo-optic lens 340. In this exemplary embodiment, the silica waveguides are substantially 6.0 μm high and exhibit an index contrast of 0.80%, disposed on a silicon substrate.

As constructed, the AWG 320 has 44 gratings arms, a free-spectral range of $\Delta f=100$ GHz, a grating inlet pitch of a=15 μm, and a star coupler radius of R=7.76 mm (in silica). Thus the width of the central Brillouin zone is 550 μm in the C-band. The gratings arms are brought close together in the grating center, where a thin half-wave plate may be inserted to achieve polarization insensitivity, as shown and described previously.

Advantageously, the polymer PLC 330 is a simple slab waveguide on a glass substrate so no core patterning is necessary. The core is 7.5-μm thick and has an index contrast of 0.45%. Both core and cladding are polysiloxane-based materials whose optical properties and overall reliability have been well characterized. (See, e.g., A. W. Norris, J. V. DeGroot, T. Ogawa, T. Watanabe, T. C. Kowalczyk, A. Baugher, and R. Blum, "High reliability of silicone materials for use as polymer waveguides" Proc. SPIE Vol. 5212, p. 76-82, November 2003; and T. C. Kowalczyk and R. Blum, "Polymer variable optical attenuator arrays: pathway from material platform to qualified telecom product", Proc. SPIE Vol. 5517, p. 50-61, October 2004)

As noted before, polymer PLC 330 acts as a thermal lens by exhibiting a parabolic (or similar) refractive index profile whose magnitude and shape can be electrically controlled. We evaluated several possible heater designs and found that a very suitable approach, which is also robust to process variations, is to use a linear array of individually addressable heaters 335[1] . . . 335[16], as shown in the inset of FIG. 3. Thermal simulations showed that despite the discrete nature of the design, a plot of core temperature vs. spatial location along the mirror should be almost perfectly parabolic (standard deviation value of $R^2>99.8\%$) when 16 individual heater elements are used and as shown in FIG. 3.

The 16 heaters (2-mm length, 40-μm spacing) 335[1] . . . 335[16] are patterned on a top surface of the polymeric polysiloxane slab using standard photolithography and connect to traces that fan out to bond pads at the two edges of the polymer PLC. Advantageously, the heaters can be individually addressed and driven with an appropriate power distribution so as to create a parabolic heat distribution, which can be either positive or negative. Because the magnitude of the index change with temperature is ~35 times higher in this polymer than in silica (the sign of the change is actually opposite that of silica), and the thermal conductivity of the polymer is ~8 times lower than in silica, the polymer thermo-optic lens consumes ~1% of the power of a corresponding silica thermo-optic lens. In addition to the much lower power consumption, our inventive approach enables a significantly larger tuning range since there are fundamental limitations on how much power can be applied to the heater electrodes and the corresponding temperature rise. While we have advantageously used polysiloxane in this exemplary embodiment, other materials, polymeric or other, may be used according to our inventive principles. Such other materials should preferably exhibit an index change of at least 2× that of silica and exhibit a thermal conductivity that is less than that of silica. In one particular embodiment, a thermal conductivity that is less than 0.5× that is silica is sufficient.

At an end of the 4.2 mm PLC opposite to the AWG, is positioned a small flat mirror 345 that is substantially 550 μm wide. The mirror 345 may be affixed to the PLC with any of a variety of known adhesives and the width of the mirror 345 is substantially equal to or less than the grating Brillouin zone width which—as we have noted earlier—ensures that high diffraction orders from the grating are not reflected back into the grating.

The dispersion exhibited when the lens is unpowered (unheated) is given by equation [1] which is expressed as:

$$D_0 = -\frac{2Rf}{n(a\Delta f)^2}$$

where f is the optical frequency, n is the refractive index, and Δf is the grating free-spectral range. This evaluates to −924 ps/nm in our case at f=194 THz. By way of comparison, an AWG having a flat mirror at one end of one of the star couplers gives negative dispersion, which is what is needed for compensating the dispersion of single mode fiber (SSMF).

As can be readily appreciated, we can use the thermo-optic lens to tune the dispersion about this negative bias point. Because the path-length differences in the AWG of our exemplary compensator 300 are so large (~87-mm path-length difference between the shortest and longest arms), significant phase errors were introduced in the fabrication that varied from device to device. Fortunately, such errors may be compensated to first order by adjusting the AWG focal length. In our exemplary device(s), this was accomplished by cutting the AWG chip in the star coupler to the proper length before attaching the polymer chip.

Before inserting the half-wave plate, the AWG polarization-dependent wavelength shift of our exemplary device was 17 pm. When no power is applied to the thermo-optic lens (heater), the dispersion is −918 ps/nm, very close to that predicted by Eq. (1).

Using thermal modeling results, an initial estimate of the 16 drive powers of the thermo-optic lens to achieve 0 ps/nm dispersion was generated. The 16 values were then manually adjusted to achieve as close to 0 ps/nm across as wide a bandwidth as possible. Advantageously, the heaters respond quickly and consistently. Accordingly, the resulting set of 16 drive powers was then multiplied by a single variable in order to tune the dispersion to any other desired value (e.g., when the variable is 0 the dispersion is −918 ps/nm, and when the variable is 1.00 the dispersion is 0 ps/nm). Thus the calibration and control are simple. For the measurements presented here, the variable ranged from −0.33 to 1.67.

Figure 4:
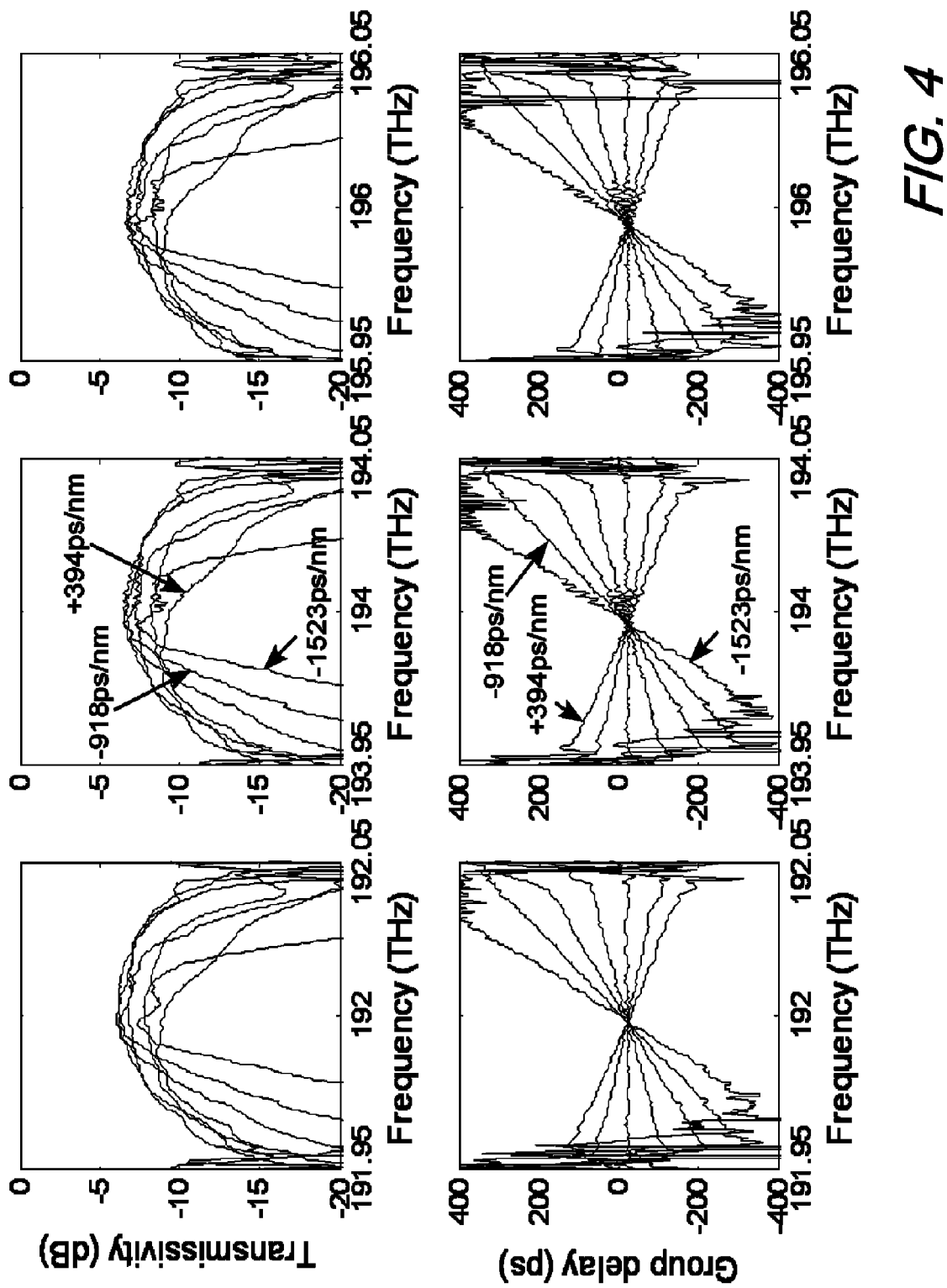
FIG. 4 shows a series of graphs showing measured transmissivity and group delay of the exemplary tunable optical dispersion compensator (not including a circulator) for seven different thermo-optic lens settings at three locations in the C-band wherein resolution bandwith is 10 pm.

The measured transmissivity and group delay are shown in FIG. 4 at three locations in the C-band for seven different thermo-optic lens settings. The average dispersion values for the seven cases are −1523, −918, −565, −269, −14, +207, and +394 ps/nm. The limit was set by requiring a reasonable transmissivity passband. The 3-dB transmissivity bandwidths are 29, 39, 54, 66, 76, 65, and 58 GHz, respectively. The lens total power consumptions are 29, 0, 15, 30, 44, 59, and 74 mW, respectively. Measuring with a 10-pm resolution bandwidth, the peak-to-peak group delay ripple (GDR) ±25 GHz from the ITU grid is typically <20 ps, but can be as high as 50 ps in the −1523-ps/nm case. The polarization-dependent loss (PDL) is typically <0.6 dB, but can be as high as 1.2 dB in the −1523-ps/nm case. The differential group delay (DGD) is typically <10 ps, but can be as high as 20 ps in the −1523-ps/nm case. There is a small reflection from the half-wave plate, which is probably the cause for the large GDR, PDL, and DGD.

As can be observed, the group delay bandwidth is nearly as wide as the FSR (100 GHz). Thus our exemplary TODC is especially suitable for compensating 40-Gb/s transmitters or non-wavelength locked 10-Gb/s transmitters on a 100-GHz grid.

Additionally, the insertion loss (not including a circulator) at the passband peak is ~7 dB. Approximately 0.7 dB is due to round-trip fiber coupling loss, ~0.8 dB is due to round-trip waveplate insertion loss, ~0.6 dB is due to round-trip diffraction loss in the AWG (estimated by simulation), and ~2.0 dB is due to round-trip propagation and coupling loss in the polymer. The unaccounted for 2.9 dB is likely due to AWG phase errors and can be eliminated with improved fabrication or post-fabrication phase-error adjustment.

As mentioned earlier, a possible figure-of-merit for TODCs is dispersion range times bandwidth-squared (bandwidth given by the smaller of the transmissivity 3-dB bandwidth [3 dB being chosen somewhat arbitrarily] or group delay bandwidth), which captures the tradeoff between achievable dispersion and bandwidth. This can be made non-dimensional by giving the dispersion in time/frequency and the bandwidth in frequency. It is a rough measure of the number of adjacent bits that are mixed together by the dispersion if the signal bandwidth occupied the entire TODC bandwidth. Note that this figure-of-merit is different than the one used for DCF, which is the dispersion divided by the loss.

The figure-of-merit for the TODC presented here is ~16 (1312-ps/nm range with >39-GHz bandwidth). As can be appreciated by those skilled in the art, this number is quite large for a PLC TODC. For comparison, we have observed a figure of merit of 5.4 with a 4-stage MZI-based PLC TODC.

Figure 5:
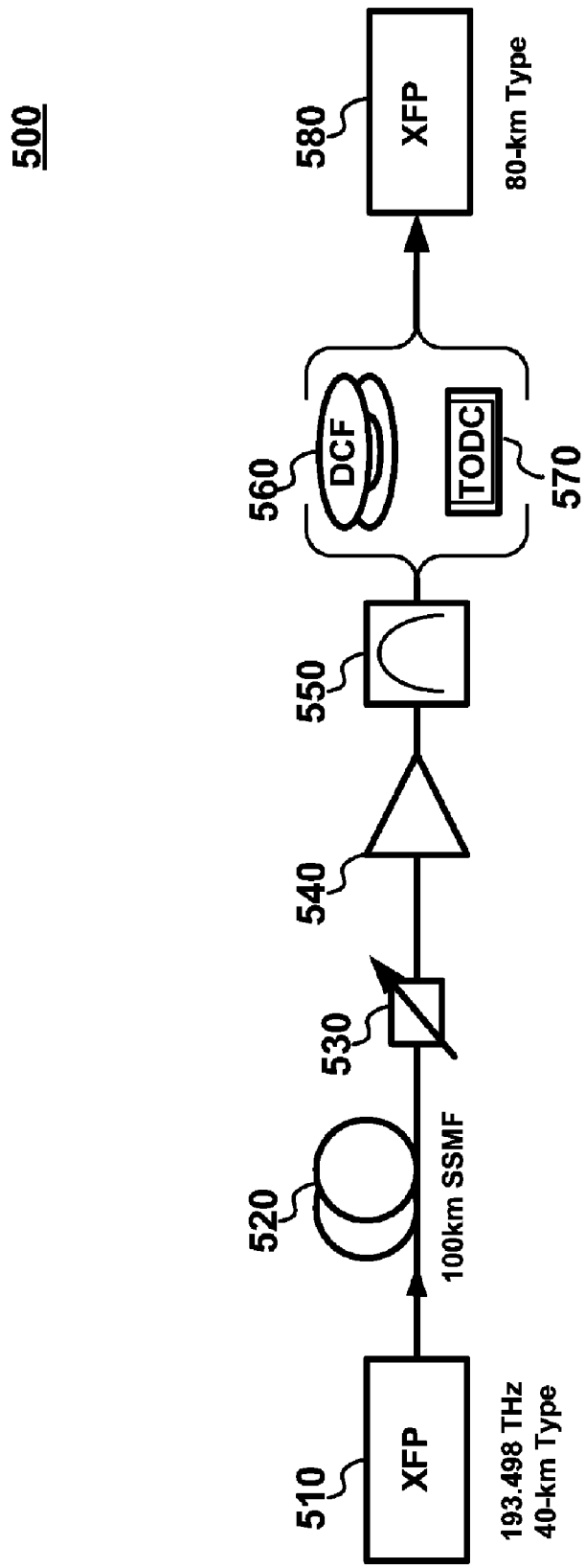
FIG. 5 is a schematic of an experimental setup used to evaluate the apparatus of FIG. 1.

FIG. 5 shows a 10-Gb/s system experimental setup for comparing our inventive TODC with DCF. With reference to that FIG. 5, a 9.953-Gb/s non-return-to-zero signal emitted from a 10-Gb/s pluggable transceiver (XFP) 510 with chirp rated for 800 ps/nm is propagated through 100 km of SSMF 520. The carrier frequency was 193.498 THz (i.e., 2 GHz off the ITU grid), and the accumulated dispersion was ~1700 ps/nm.

The signal is then amplified 540, filtered 550, and passed through either −844 ps/nm of DCF 560 or through the TODC 570, with its dispersion set to −844 ps/nm. The receiver was another XFP 580 with an avalanche photodiode.

Figure 6:
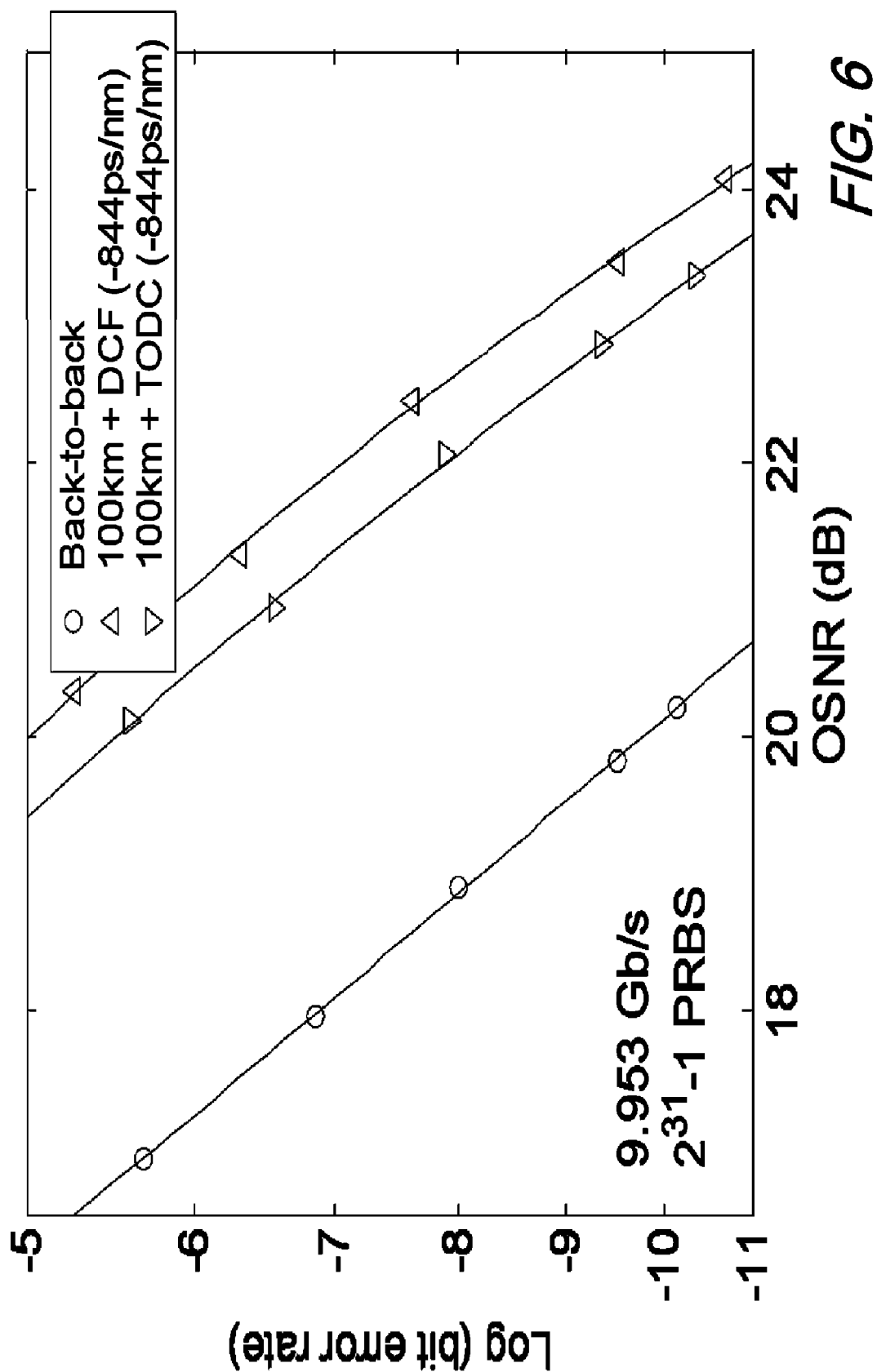
FIG. 6 is a graph showing bit-error rate vs. signal-to-noise ratio of the experimental setup used to evaluate the apparatus of FIG. 5.

Without any dispersion compensation the observed performance was very poor [$10^{-5}$ bit-error rate (BER) at 27-dB optical signal-to-noise ratio (OSNR)]. FIG. 6 shows a graph of BER vs. OSNR for the two cases with dispersion compensation, plus the back-to-back case.

The performance with the TODC was actually slightly better than with the DCF. This could be from self-phase modulation in the DCF, because the launch power into the DCF was ~+2 dBm, and the signal is highly dispersed at that point. There was a polarization dependence of ~0.5 dB in OSNR in the TODC case. DWDM XFPs typically have a ±12.5 GHz end-of-life wavelength accuracy. Although we could not adjust the XFP wavelength, one can see from FIG. 3 that the bandwidth should be wide enough to accommodate this drift.

While we have shown an exemplary embodiment of our inventive tunable dispersion compensation apparatus a number of arrangements of similar apparatus exhibiting our inventive teachings are possible. FIG. 7 is a schematic of an alternative embodiment of a tunable dispersion compensator wherein the PLC 125 including heating elements 130 is disposed in an optical path "within the body" of the second slab waveguide 120.

With reference now to that FIG. 7, the dispersion compensation apparatus 700, while similar to that shown earlier in FIG. 2, does not have the PLC 125 positioned adjacent to the second slab waveguide 120. Instead, it is positioned in an optical path within the body of the second slab waveguide 120 itself.

Advantageously, such a configuration may favorably facilitate the fabrication of our inventive dispersion compensation apparatus as receiving grooves (or other shapes—not specifically shown) are scribed or otherwise formed in the body of the slab waveguide 120 where it/they may receive the suitable materials for effecting the thermo-optic lens. As a result, a substantially more integrated device is realized, exhibiting improved manufacturability.

Figure 8A:
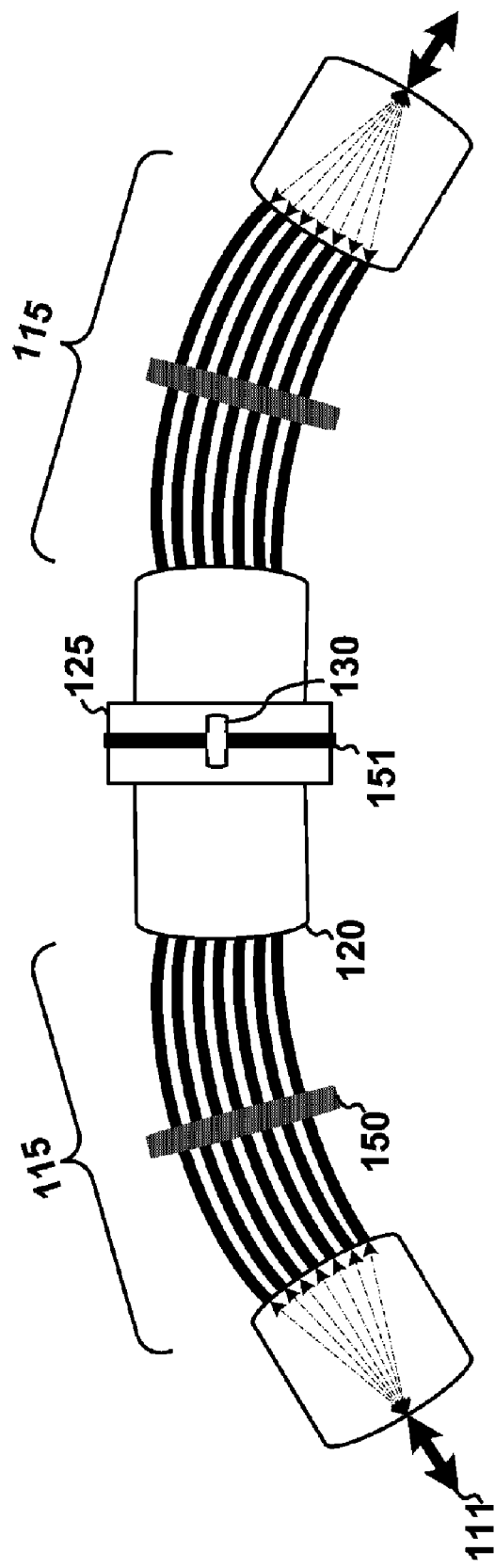
FIG. 8($a$) shows a schematic of an "unfolded" variation of a dispersion compensation apparatus according to the present invention.
Figure 8B:
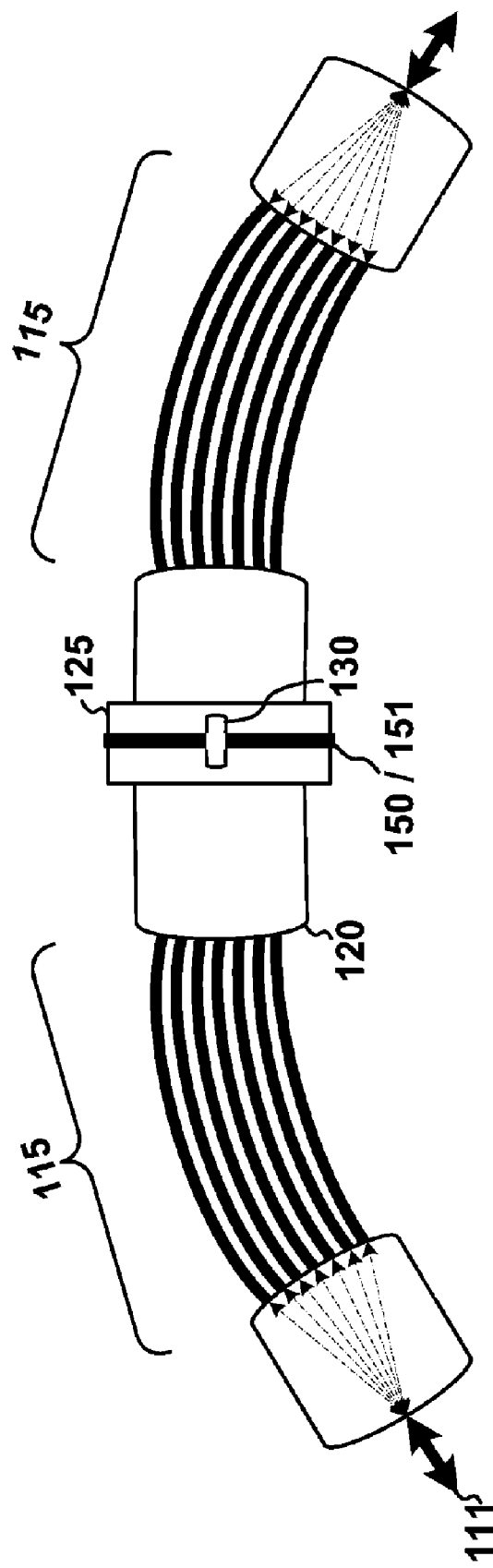
Figure 8C:
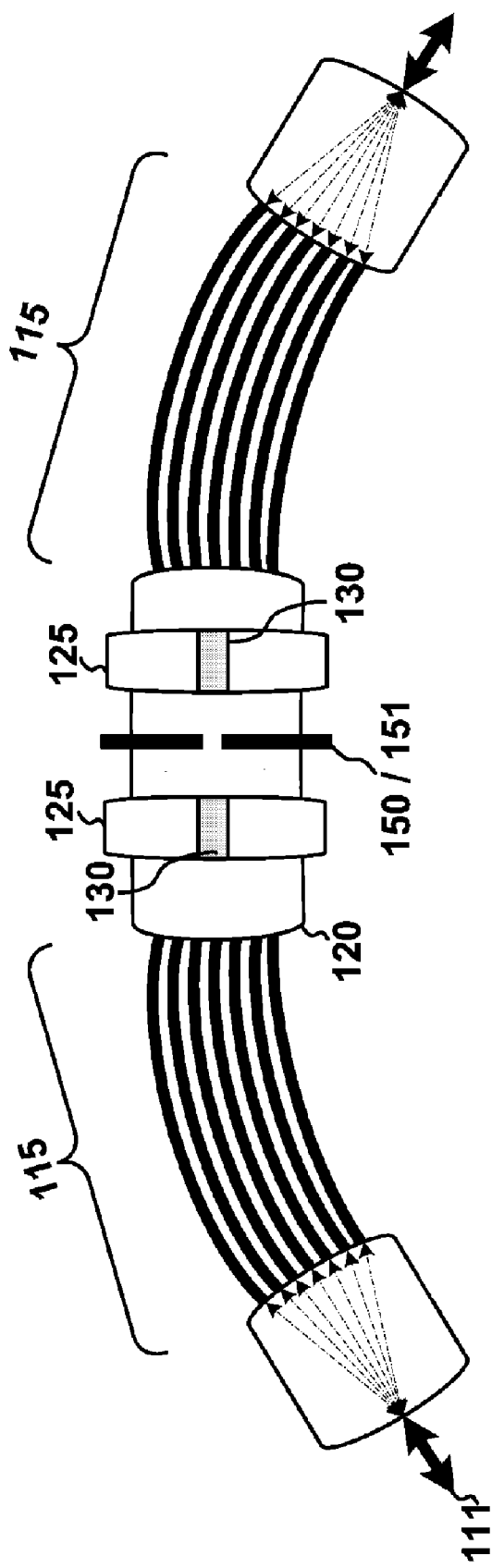

Additional, alternative embodiments are shown in FIGS. 8(*a*)-(*c*), wherein "unfolded" dispersion compensation apparatus' are depicted. The unfolded variation generally comprises two frequency routing devices positioned in sequence such that one of the slab waveguides comprising each of the devices are optically coupled, "back-to-back". According to our inventive teachings, a thermo-optic lens is positioned at the interface between the two frequency routing devices.

As shown in FIG. 8(*a*), a slab waveguide 120 of a frequency routing device is coupled to another frequency routing device. Interposed between and optically coupling the two frequency routing devices, is PLC 125 including heating elements 130 thereby serving as a thermo-optic lens as before. Shown in this FIG. 8(*a*) is an iris 151 which prevents unwanted optical coupling between the two frequency routing devices. As can be observed from this FIG. 8(*a*), this apparatus includes a half-wave plate(s) 150, interposed in the grating arms.

A further variation of this dispersion compensation apparatus is shown schematically in FIG. 8(*b*). More particularly, the half wave plate is combined with iris assembly 150/151 and the two elements are collectively interposed between the two frequency routing devices.

Finally with respect to the unfolded dispersion compensation apparatus, FIG. 8(*c*) shows a device in which the PLCs 125 are not positioned at the interface between the two frequency routing devices, rather they are positioned in an optical path within their respective slab waveguide(s) 120. As before, the PLC 125 includes heating elements 130 thereby producing a thermo-optic lens while improving the manufacturability of the unfolded device. Also shown in this FIG. 8(*c*) is integrated iris/half wave plate 150/151 interposed between the two frequency routing devices.

So far we have mainly limited the discussion to compensation of first-order chromatic dispersion. The TODC described here is also capable of compensating high-order dispersion, by using a non-parabolic index distribution in the lens. For example, using a cubic index distribution could compensate for second-order dispersion. Furthermore, the TODC is capable of providing a plain shift in group delay. In this case, the thermooptic lens would have a linear index distribution.

At this point, while we have discussed and described our invention using some specific examples, those skilled in the art will recognize that our teachings are not so limited. In particular, different materials—both polymeric and other may be used as thermo-optic PLC devices, where their optical and thermal characteristics are suitable. In addition, while we have used a waveguide grating in our examples shown, other PLC-based gratings such as an echelon diffraction grating could be used as well. Finally, it is noted that the unfolded arrangements described may be advantageously fabricated on the same substrate, (or not as desired) further enhancing their manufacturability. Accordingly, our invention should be only limited by the scope of the claims attached hereto.

What is claimed is:

1. An optical apparatus comprising:
   a first planar lightwave circuit (PLC-1) including:
      a first slab waveguide;
      a second slab waveguide; and
      a grating, optically interconnecting the first slab waveguide with the second slab waveguide;
   a second planar lightwave circuit (PLC-2), positioned adjacent to the PLC-; and
   a mirror, positioned adjacent to said PLC-2 at a side of said PLC-2 opposite said PLC-1;
   wherein at least one portion of said PLC-2 exhibits a refractive index rate of change magnitude with temperature of at least 2× that of the PLC-1, and said mirror has a width less than or equal to the width of the Brillouin zone.

2. The optical apparatus of claim 1 wherein PLC-2 exhibits a thermal conductivity which is less than 0.5× that of PLC-1.

3. The optical apparatus of claim 1, wherein said PLC-2 further includes:
   a heater, for effecting the one or more thermo-optic lens.

4. The optical apparatus of claim 3 wherein said PLC-1 is constructed from silica.

5. The optical apparatus of claim 4, wherein said PLC-2 is constructed from a polymer.

6. The optical apparatus of claim 5 wherein the polymer from which said PLC-2 is constructed is substantially polysiloxane.

7. The optical apparatus of claim 1, wherein said PLC-1 further includes:
   a half-wave plate, interposed between the first slab waveguide and the second slab waveguide.

8. The optical apparatus of claim 1, further comprising:
   a quarter-wave plate, interposed between the mirror and PLC-2.

9. The optical apparatus of claim 3, wherein said heater comprises one or more heating elements, the heating of which is effected through the application of electrical power.

10. The optical apparatus of claim 1, wherein said PLC-2 exhibits a substantially parabolic refractive index profile whose magnitude may be thermally controlled.

11. The optical apparatus of claim 10 wherein said PLC-2 is disposed upon a glass substrate.

12. An optical apparatus comprising:
    a first planar lightwave circuit (PLC-1) including:
       a first slab waveguide;
       a second slab waveguide; and
       a grating, optically interconnecting the first slab waveguide with the second slab waveguide; and
    a thermo-optic lens, disposed in an optical path and within the body of the second slab waveguide of the PLC-1 wherein said thermo-optic lens exhibits a refractive index change magnitude with temperature of at least 2× that of the PLC-1; and
    a mirror, positioned adjacent to said second slab waveguide at a side opposite that of the grating, said mirror having a width less than or equal to the width of the Brillouin zone.

13. The optical apparatus of claim 12 further comprising:
    a heater, for effecting the refractive index change of the thermo-optic lens.

14. The optical apparatus of claim 13 wherein said thermo-optic lens exhibits a thermal conductivity which is less than 0.5× that of PLC-1.

15. The optical apparatus of claim 14 wherein said PLC-1 is constructed from silica and said thermo-optic lens is constructed from a polymer.

16. The optical apparatus of claim 15 wherein said polymer is substantially polysiloxane.

17. An optical apparatus comprising:
- a first frequency routing device having two slab waveguides optically interconnected by a grating;
- a second frequency routing device having two slab waveguides optically interconnected by a grating;
- one or more thermo-optic lenses which exhibit a refractive index rate of change with temperature, said thermo-optic lenses being interposed between, and in an optical path that optically connects the first frequency routing device to the second frequency routing device; and
- an iris, interposed between the first and second frequency routing devices said iris having an opening width that is less than or equal to the width of the Brillouin zone;
- wherein the refractive index rate of change exhibited by the thermo-optic lenses has a magnitude of change with temperature of at least 2× that of the first and second frequency routing devices.

18. The optical apparatus of claim 17 further comprising one or more heaters, for effecting the refractive index change of the thermo-optic lenses.

19. The optical apparatus of claim 17, wherein said first and second frequency routing devices are constructed substantially of silica and said thermo-optic lenses are constructed from polymer.

20. The optical apparatus of claim 1, wherein the portion of the PLC-2 exhibiting the refractive index rate of change magnitude with temperature of at least 2× that of the PLC-1 comprises one or more thermo-optic lens.

* * * * *